Patented May 31, 1927.

1,630,593

UNITED STATES PATENT OFFICE.

CHARLES O. YOUNG, OF JACKSON HEIGHTS, NEW YORK, ASSIGNOR TO CARBIDE & CARBON CHEMICALS CORPORATION, A CORPORATION OF NEW YORK.

PROCESS OF MAKING ESTERS FROM ALDEHYDES.

No Drawing. Application filed August 12, 1925. Serial No. 49,838.

This invention relates to improvements in the manufacture of esters by condensation or polymerization of aldehydes.

The invention has for one of its principal objects a process of making esters whereby good yields of product of high purity may be obtained.

Further objects of the invention will appear as the description proceeds.

The reaction which takes place in the condensation or polymerization of aldehydes to esters may be illustrated by the following equation:—

$$2R.CHO = R.CO.OCH_2.R$$

where R represents either an alkyl or aryl residue.

Aluminum alkoxy compounds have heretofore been used as catalysts in making esters from aldehydes. While good yields have been obtained the product has often been contaminated by the presence of undesired substances resulting from interaction of the alcohol radical of the catalyst and the aldehyde. Such contaminating substances are formed, for example, when aluminum butoxide is used as a catalyst in making ethyl acetate, or when aluminum ethoxide is used in making butyl butyrate. These esters are difficult to separate from the product because their boiling points are close to those of the desired esters and also because the mixture of esters formed tends to boil at a constant temperature.

I have found that the use of a catalyst in preparing esters of the product resulting from the reaction between aluminum and ethylene glycol monoethyl ether eliminates the difficulty above mentioned. Any esters which may be formed from interaction of the organic radical of the catalyst and the aldehyde used will boil sufficiently high to permit of their ready separation from esters such as ethyl acetate and butyl butyrate.

In preparing esters from aldehydes according to the present invention, the catalyst, either in a molten state or in the form of a solution preferably in ester of the kind desired to be formed, is slowly added in the proportion of 2 to 10 per cent to pure anhydrous aldehyde, while the temperature of the reaction mixture is controlled within a limited range by suitable cooling means, for example, an ice bath. As soon as the reaction is completed, water in amount preferably not greater than that theoretically necessary to decompose the catalyst is added to the reaction mixture to render it inactive. The mixture is then rectified and the desired ester is obtained in a practically pure state. The yield is usually approximately 85 to 90% of theory. A small quantity of resinous material usually forms as a by-product.

The catalyst may be prepared by bringing finely divided aluminum into contact with anhydrous ethylene glycol monoethyl ether, preferably in the proportion theoretically required to form the aluminum salt. The reaction is readily initiated by adding a small amount of the preformed aluminum compound, although other materials, for example, aluminum butoxide, may be used. The reaction proceeds according to the following equation:

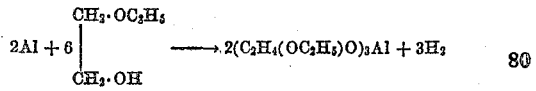

$$2Al + 6 \begin{matrix} CH_2 \cdot OC_2H_5 \\ | \\ CH_2 \cdot OH \end{matrix} \longrightarrow 2(C_2H_4(OC_2H_5)O)_3Al + 3H_2$$

While I have stated that my new catalyst may be used in preparing ethyl acetate and butyl butyrate, it is to be understood that it may be used in preparing other esters both of the aliphatic and of the aromatic groups as well as mixed esters. Examples are benzyl benzoate from benzaldehyde and ethyl butyrate and butyl acetate from a mixture of acetaldehyde and butyraldehyde.

I claim:

1. Process of making esters which comprises bringing an aldehyde into contact with the product formed by the reaction between aluminum and ethylene glycol monoethyl ether.

2. Process of making esters which comprises bringing anhydrous aldehyde into contact with a catalyst comprising the aluminum alkoxy derivative of ethylene glycol monoethyl ether having the formula $(C_2H_4(OC_2H_5)O)_3Al$.

3. Process of making ethyl acetate which comprises bringing acetaldehyde into contact with a catalyst comprising the compound having the formula $$(C_2H_4(OC_2H_5)O)_3Al.$$

4. Process of making esters which comprises bringing a substantially pure anhydrous aldehyde into contact with a catalyst comprising the compound having the formula $(C_2H_4(OC_2H_5)O)_3Al$.

In testimony whereof, I affix my signature.

CHARLES O. YOUNG.